No. 608,770. Patented Aug. 9, 1898.
E. H. GODFRAY.
GEARING FOR BICYCLES.
(Application filed Aug. 17, 1897.)
(No Model.) 3 Sheets—Sheet 1.

Witnesses:
R. Schleicher.
J. J. Williamson

Inventor
Ernest H. Godfray
by Geo. H. Holgate
Attorney

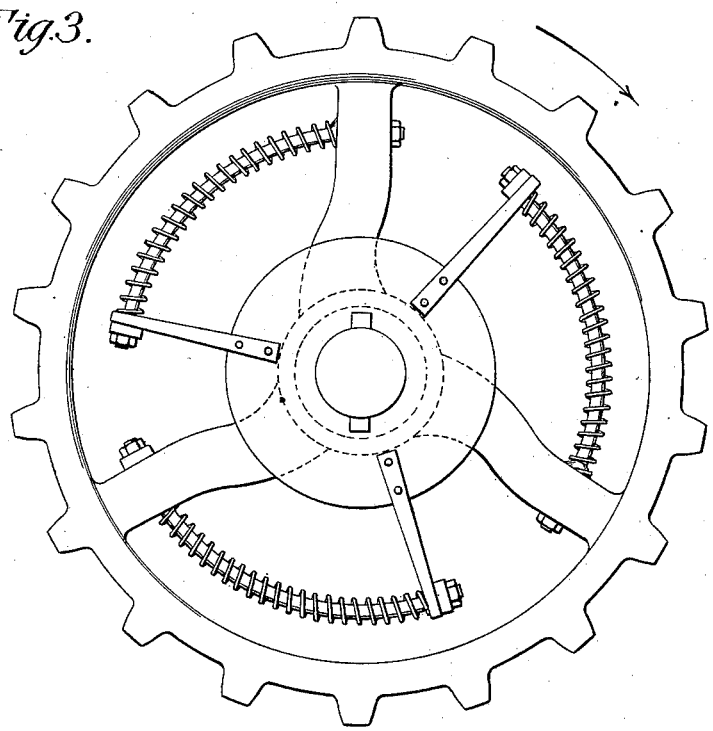
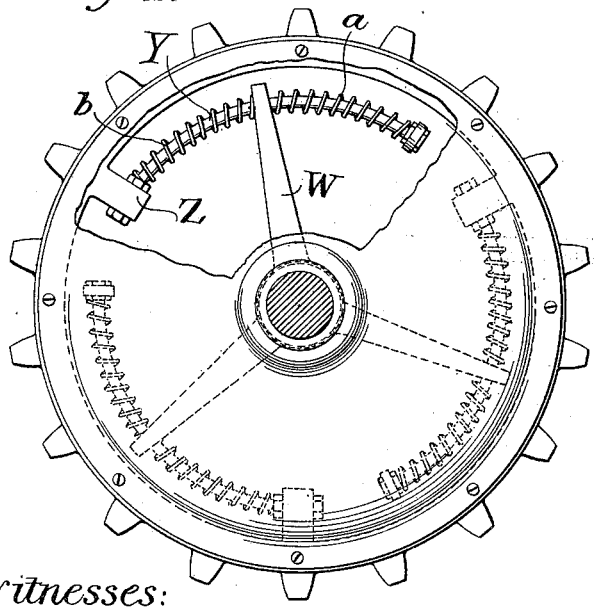
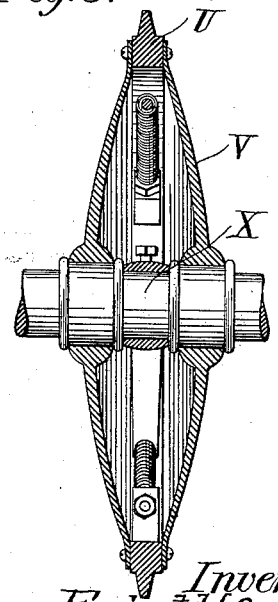

No. 608,770. Patented Aug. 9, 1898.
E. H. GODFRAY.
GEARING FOR BICYCLES.
(Application filed Aug. 17, 1897.)
(No Model.) 3 Sheets—Sheet 3.

Witnesses:
R. Schleicher.
S. S. Williamson.

Inventor
Ernest H. Godfray
by Geo. H. Holgate
Attorney

THE NORRIS PETERS CO., PHOTO-LITHO., WASHINGTON, D. C.

UNITED STATES PATENT OFFICE.

ERNEST H. GODFRAY, OF QUANAH, TEXAS.

GEARING FOR BICYCLES.

SPECIFICATION forming part of Letters Patent No. 608,770, dated August 9, 1898.

Application filed August 17, 1897. Serial No. 648,600. (No model.)

*To all whom it may concern:*

Be it known that I, ERNEST H. GODFRAY, a citizen of the United States, residing at Quanah, in the county of Hardeman and State of Texas, have invented a certain new and useful Improvement in Gearings for Bicycles and the Like, of which the following is a specification.

My invention relates to a new and useful improvement in gearing for bicycles and the like, and has for its object to so construct and arrange a device of this description as to avoid sudden shocks or jars which are occasioned by unevennesses in the road-bed over which the machine is traveling, and also to enable the rider to exert a sudden force upon the pedals without straining the framework or wheels of the machine.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
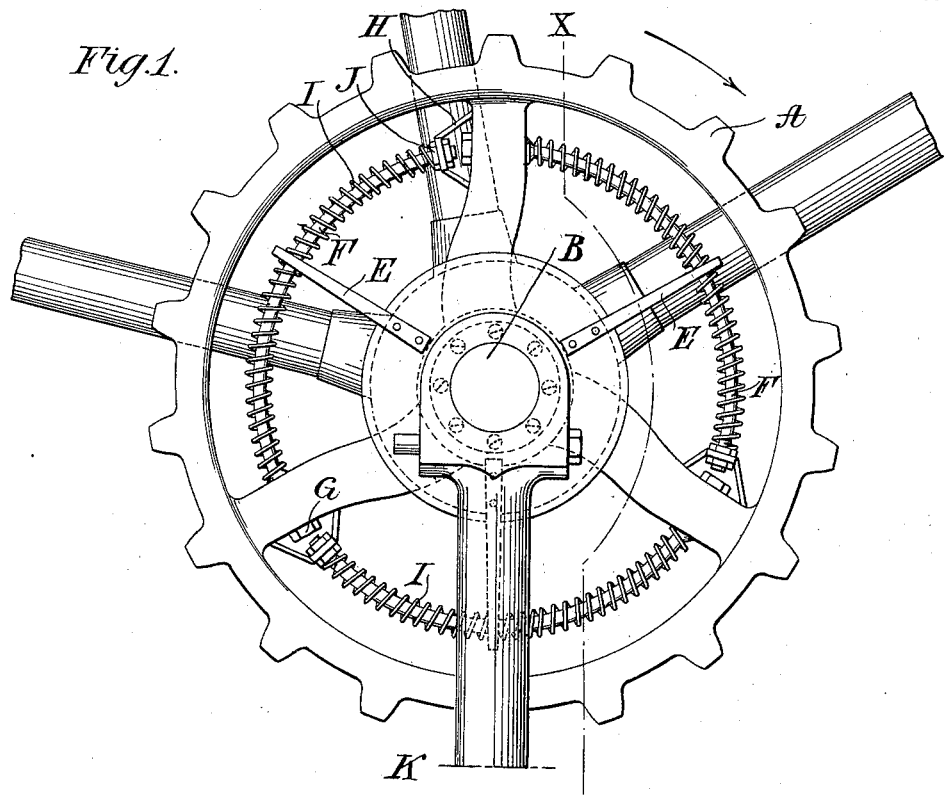
Figure 6:
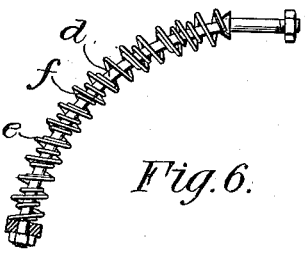
Figure 2:
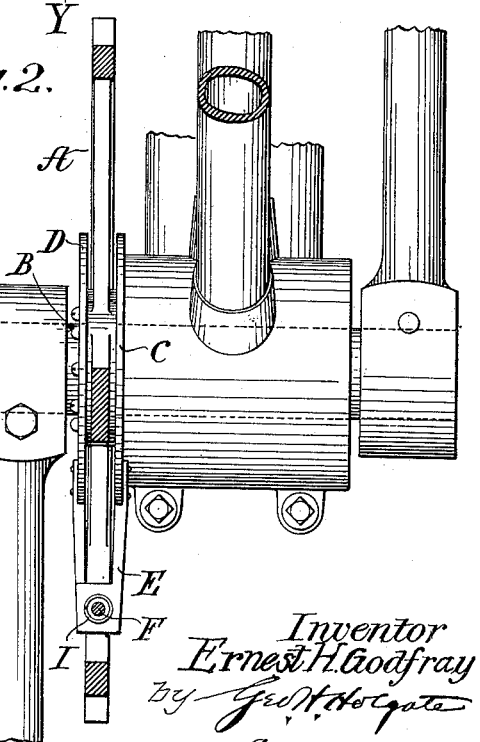
Figure 7:
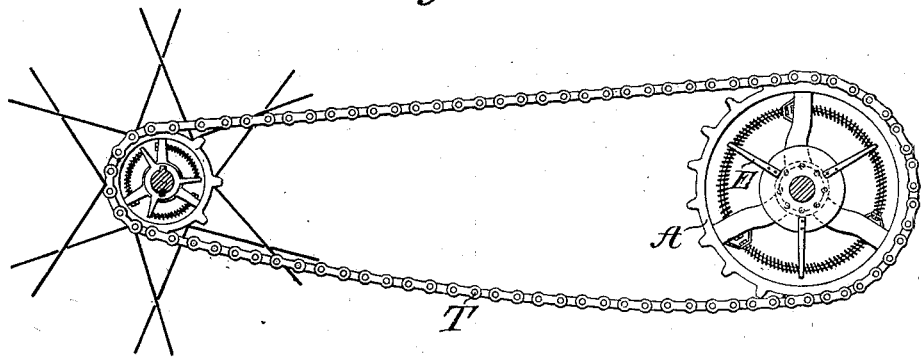
Figure 8:
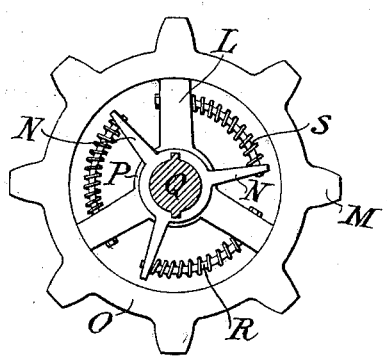

Figure 1 is a side view of the crank sprocket-wheel of a bicycle, showing one form of my improvement therein; Fig. 2, a section at the line *x x* of Fig. 1; Fig. 3, a side elevation of a crank sprocket-wheel showing a slightly-modified form of my invention; Fig. 4, a still further modification in which the sprocket-wheel is incased; Fig. 5, a central section of Fig. 4; Fig. 6, a detail view of one of the curved rods, showing a double spring coiled thereabout; Fig. 7, a view representing the front and rear sprocket-wheels of the bicycle geared together by the usual chain, and Fig. 8 an enlarged elevation of the rear sprocket-wheel.

Referring to Figs. 1, 2, and 3, A represents the front sprocket-wheel of the bicycle, which is journaled upon an enlargement of the crank-shaft B and is held in place laterally thereon by means of the disks C and D, the former being preferably made with the enlargement, while the latter is secured in place by suitable screws for convenience in assembling. By this arrangement these plates are made rigid with the crank-shaft, while the sprocket-wheel is left free to revolve upon the enlargement independent of said shaft, for the purpose hereinafter set forth.

A series of arms E, here shown as three in number, project radially from the disks and are offset at their outer ends, through which holes are formed for the free passage of the curved rods F. These rods are screwed to the spokes of the sprocket-wheel, preferably by one of the spokes being held in place by a suitable nut G, while the opposite end is held in the bracket H, projecting from the spoke. Around these curved rods, upon either side of the arms E, are coiled springs I, and the tension of these springs may be varied by means of the nuts J, which run upon said rods, the latter being threaded sufficiently for this purpose. From this it will be seen that power applied to the crank-shaft from the cranks K will cause the disks to rotate, and with them the arms E, and the latter will compress one set of the springs I and cause the sprocket-wheel to rotate.

The rear sprocket-wheel is similar in most respects to the front sprocket-wheel just described. P represents the hub, loosely mounted on the axle Q. With the hub are formed the spokes L, and to these spokes are secured the curved rods R, arranged concentric with the sprocket-rim O. These rods are run through holes in the arms N, which are rigidly secured to the axle as near as possible to the hub P. S indicates the springs which are coiled on the rods between the spokes and arms. The operation of this sprocket is exactly the same as that of the front sprocket.

R are the curved rods upon which the circular springs S are placed and interposed between the spokes of the sprocket and the arms in such manner that when the sprocket-wheel is revolved these springs will be more or less compressed until the power applied to the arms is sufficient to overcome the resistance offered to the revolving of the drive-wheel, it being preferable that the curved rods R should pass through suitable holes in the spokes and have nuts run upon their outer ends, whereby the tension of the springs may be varied.

Now when power, as before described, has been applied to the front sprocket-wheel to cause the same to revolve the rear sprocket-wheel will be revolved in unison therewith through the medium of the chain T, as is well understood, and this rotary motion of the rear sprocket-wheel will compress the springs S, thereby storing a certain amount of power therein until the force thereof overcomes the inertia of the machine, when the latter will be given a forward movement by the reaction of the springs, and this forward motion will be maintained by the constant action of the springs thereafter so long as the rider continues to store power in these springs and the springs of the front sprocket-wheel by the rotation of the pedals.

My improvement is especially adapted for use upon bicycles intended to be ridden over rough roads and up steep inclines, since the dead-centers will not affect the propelling power of the rider, as when the cranks are passing the dead-centers the power stored in the springs will continue to act upon the drive-wheel to cause it to maintain its motion, and as this is the principal drawback in forcing a machine up a steep incline it will be seen that much advantage is gained by my improvement.

A bicycle having my improvement applied thereto will receive less wear and tear, since the power applied thereto will be cushioned, thereby preventing undue shock or strain coming upon either the frame or the wheels of the machine, and this is likewise true in connection with the rider, since sudden jars or shocks are not transmitted to his muscles, thereby being less fatiguing.

In Figs. 4 and 5 I have shown a slight modification of the front sprocket-wheel, in which case the rim U may be held in place by the webs V on the arms W, secured to the crank-shaft X in the center of said webs. The curved rods Y are secured to the supports Z and loosely passed through the holes in the arms, and around these rods are coiled the springs $a$ and $b$, by which the machine may be driven either backward or forward, as will be readily understood, and this is also the case in the construction shown in Fig. 1.

In Fig. 6 I have illustrated a curved rod $d$ having two springs $e$ and $f$ coiled thereabout, by which arrangement an increased strength may be had.

Having thus fully described my invention, what I claim as new and useful is—

1. Gearing for bicycles and the like, consisting of a sprocket-rim, curved rods concentric with the rim, arms arranged on the rods intermediate of the ends thereof, springs coiled on said rods on each side of the arms, whereby when said arms are moved in either direction said springs will be compressed, a shaft to which said arms are secured, and means for holding said sprocket-rim concentric with the shaft and also from longitudinal movement thereon, as and for the purpose set forth.

2. In combination with a bicycle, webs loosely mounted in grooves of the shaft, a sprocket-rim held between said webs, arms rigidly secured to the shaft on that part inclosed by the webs, curved rods secured to supports on the inner edge of the rim and run through holes in the arms, and springs coiled on said rods and interposed between the supports and the arms, substantially as described.

In testimony whereof I have hereunto affixed my signature in the presence of two subscribing witnesses.

ERNEST H. GODFRAY.

Witnesses:
T. B. CARTER,
J. B. ROBERTSON.